United States Patent
Stewart

[11] Patent Number: 5,827,147
[45] Date of Patent: Oct. 27, 1998

[54] PLANETARY GEAR HAVING A CERAMIC TUBULAR SLEEVE AS BEARING MEANS

[76] Inventor: Matthew M. Stewart, 9794 Country Oaks Dr., Ft. Myers, Fla. 33912

[21] Appl. No.: 856,124

[22] Filed: May 14, 1997

[51] Int. Cl.⁶ .............................. F16H 1/28; F16C 32/06
[52] U.S. Cl. ........................... 475/331; 475/346; 74/443; 384/913; 384/907.1
[58] Field of Search ..................................... 475/331, 344, 475/345, 346, 348; 74/443; 384/907.1, 913, 275, 296

[56] References Cited

U.S. PATENT DOCUMENTS

| | | | |
|---|---|---|---|
| 3,418,028 | 12/1968 | Watson et al. | 384/913 X |
| 3,834,248 | 9/1974 | Caliri | 74/443 |
| 4,269,262 | 5/1981 | Knapp et al. | 74/443 X |
| 4,754,494 | 6/1988 | Kumar | 384/913 X |
| 4,767,677 | 8/1988 | Kuwayama | 384/913 X |
| 4,901,602 | 2/1990 | Matoba | 475/331 X |
| 5,211,611 | 5/1993 | Lammers et al. | 475/178 X |
| 5,382,203 | 1/1995 | Bellman et al. | 475/331 |
| 5,470,286 | 11/1995 | Fan | 475/331 |
| 5,695,424 | 12/1997 | Mizuta | 475/331 |

*Primary Examiner*—Khoi Q. Ta
*Attorney, Agent, or Firm*—Gifford, Krass, Groh, Sprinkle, Patmore, Anderson & Citkowski, P.C.

[57] ABSTRACT

A planetary gear assembly for a transmission is disclosed having a carrier with two spaced apart plates. A plurality of cylindrical axles extend between and are secured to the plates so that these axles are spaced apart and generally parallel to each other. A gear having an inner cylindrical surface is coaxially disposed around each axle. Furthermore, a tubular cylindrical ceramic sleeve is positioned between the outer surface of each axle and the inner cylindrical surface of each gear. The cylindrical sleeve serves as a bearing between the shaft and its associated gear.

4 Claims, 2 Drawing Sheets

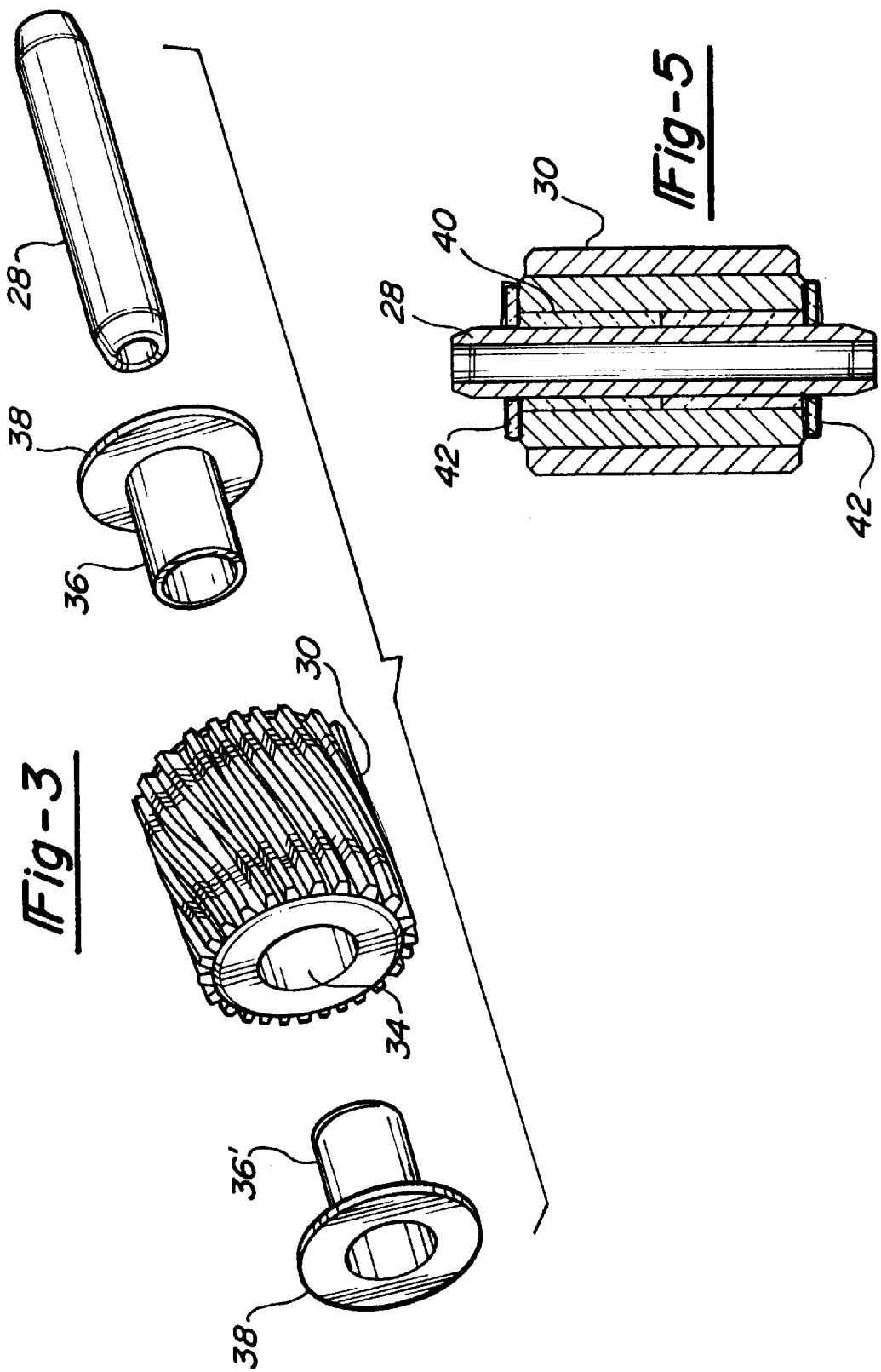

PLANETARY GEAR HAVING A CERAMIC TUBULAR SLEEVE AS BEARING MEANS

BACKGROUND OF THE INVENTION

I. Field of the Invention

The present invention relates generally to a planetary gear assembly for a transmission and, more particularly, to such a planetary gear assembly with a novel bearing arrangement.

II. Description of the Prior Art

In many automatic transmissions particularly of the type used in automotive vehicles, planetary gear assemblies are utilized throughout the automatic transmission. The number of individual planetary gear assemblies utilized in a given automatic transmission will vary depending upon the number of transmission speeds as well as other criteria.

The conventional prior art planetary gear assemblies simply comprised a carrier having a pair of spaced apart metal plates. A plurality of cylindrical axles extend between and are secured to the plates such that the axles are spaced apart and parallel to each other. A gear is then rotatably mounted about each axle.

One such prior art axle 10 and gear 12 is illustrated in FIG. 2. As shown in FIG. 2, a plurality of needle bearings 14 are disposed between the gear 12 and the axle 10 in order to rotatably mount the axle 10 and gear 12 together. One or more washers 16 also extends across each end of the gear 12 around the axle 10 in order to retain the needle bearings 14 properly positioned between the shaft 10 and gear wheel 12.

There are a number of disadvantages of this previously known planetary gear assembly. One such disadvantage is that the washers 16 often become worn and fail after prolonged use. When this happens, the needle bearings are no longer properly retained between the gear wheel 12 and the shaft 10 which can result in destruction of the planetary gear assembly.

A still further disadvantage is that needle bearings are noisy in operation. Such noise typically consists of a high pitch where caused by rotation of the needle bearings.

A still further disadvantage of these previously known planetary gear assemblies is that the needle bearings 14 are typically constructed of steel. In use, however, the needle bearings become very heated and thermally expand. Such thermal expansion not only can, but does, frequently result in failure of the planetary gear assembly.

SUMMARY OF THE PRESENT INVENTION

The present invention provides a planetary gear assembly which overcomes all of the above-mentioned disadvantages of the previously known devices.

In brief the planetary gear assembly of the present invention comprises a carrier having two spaced apart plates. A plurality of cylindrical axles extend between and are secured to the plates such that the axles are spaced apart and parallel to each other.

A gear having an inner cylindrical surface is coaxially disposed around each axle. Each gear, furthermore, is rotatably mounted to its associated axle.

Unlike the previously known devices, however, in the present invention, a tubular and cylindrical sleeve constructed of ceramic is disposed between the outer surface of the shaft and the inner surface of its associated gear. This ceramic sleeve not only forms the bearing between the axle and its associated gear but the sleeve, because it is constructed of ceramic, exhibits only minimal thermal expansion.

As a further advantage of Applicant's invention, the sleeve preferably includes a radially outwardly extending lip along one end which is of a one piece construction with the cylindrical sleeve and thus constructed of ceramic. As such, the previously known two piece needle bearing and washer arrangement is replaced by the single piece ceramic sleeve and radially outwardly extending lip.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 3 is an exploded view illustrating the preferred embodiment of the present invention;

FIG. 5 is a sectional view similar to FIG. 4 but illustrating a modification thereof.

DETAILED DESCRIPTION OF PREFERRED EMBODIMENTS OF THE PRESENT INVENTION

Figure 1:
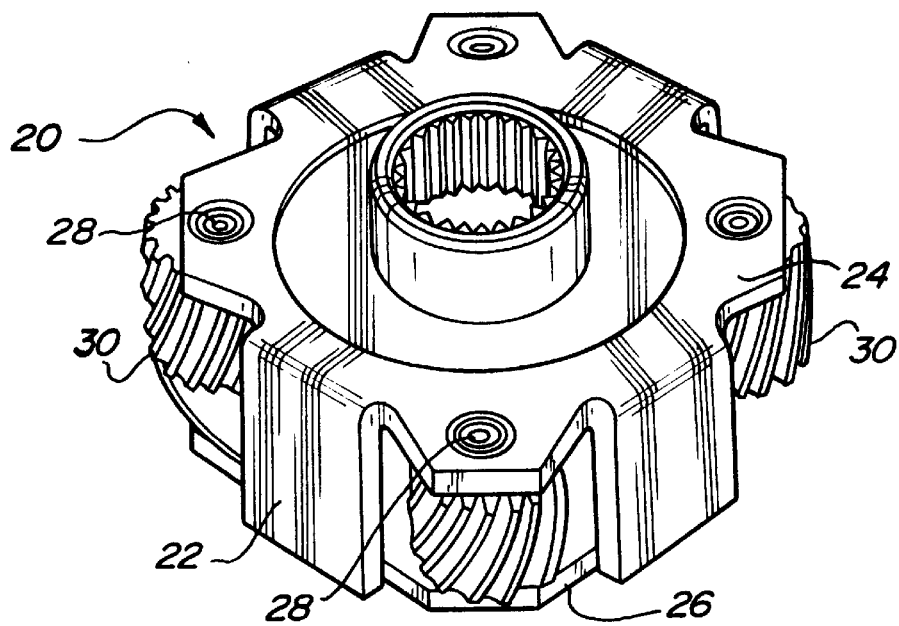
FIG. 1 is an elevational view illustrating a preferred embodiment of the present invention.
Figure 2:
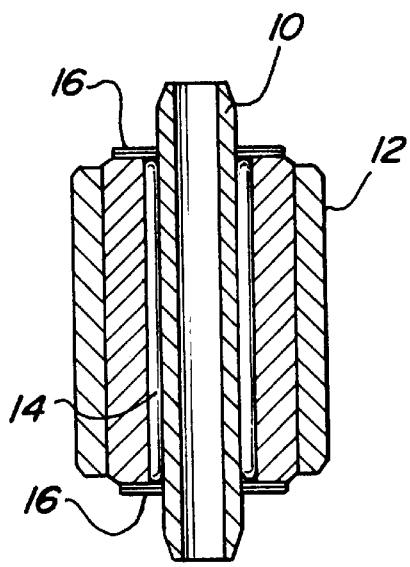
FIG. 2 is a sectional view of a portion of a prior art planetary gear assembly.

With reference first to FIG. 1, a preferred embodiment of the planetary gear assembly 20 of the present invention is there shown and comprises a carrier 22 having a pair of spaced apart plates 24 and 26.

Still referring to FIG. 1, a plurality of axles 28 extend between and secured to the plates 24 and 26 such that the axles 28 are spaced apart and parallel to each other. A gear 30 is coaxially disposed around each axle 28.

Figure 4:
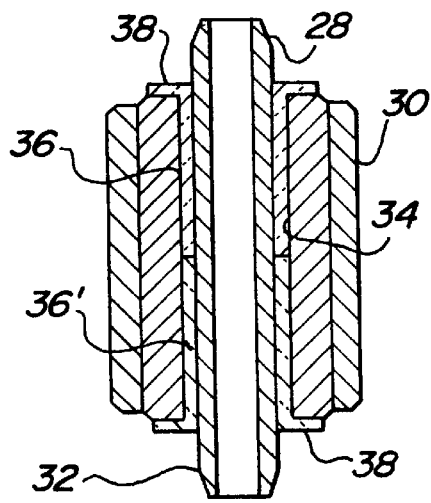
FIG. 4 is a sectional view illustrating a portion of the preferred embodiment of the present invention.

With reference now to FIGS. 3 and 4, the axle 28 includes a cylindrical outer surface 32 while, similarly, the gear 30 includes an inner cylindrical surface 34 which is spaced radially outwardly from the surface 32. In order to rotatably mount the gear 30 to its associated axle 28, a tubular and cylindrical sleeve 36 is disposed between the outer surface 32 of the shaft 28 and the inner surface 34 of the gear 30.

The sleeve 36 is constructed of a ceramic material such that the sleeve 36 exhibits almost negligible thermal expansion. Furthermore, although a single elongated sleeve 36 may be positioned between the gear 30 and shaft 28, in the preferred embodiment of the invention, a pair of sleeves 36 and 36' are positioned between the gear 30 and shaft 28 such that the sleeves 36 and 36' are coaxial and axially adjacent each other.

Still referring to FIGS. 3 and 4, in the preferred embodiment of the invention, a radially outwardly extending lip or flange 38 is provided at one end of each sleeve 36 and 36' so that the sleeves 36 and 36' and their associated flange 38 are of a one piece construction.

The sleeves 36 and 36' are thus inserted into opposite ends of the gear 30 so that the flanges 38 overlap a portion of opposite ends of the gear 30 as best shown in FIG. 4. In doing so, the flanges 38 prevent direct contact between the gear 30 and the plates 24 and 26 of the carrier 22. This in turn prevents overheating and thermal breakdown of the type associated with previously known metal washers.

With reference now to FIG. 5, an alternate embodiment of the present invention is there shown in which a single piece tubular and cylindrical sleeve 40 is disposed between the gear 30 and shaft 28. The single piece sleeve 40, like the sleeves 36 and 36', is constructed of a ceramic material. Unlike the sleeves 36 and 36', however, the sleeve 40 does not include the annular flange 38 at the opposite ends. Instead, a conventional washer 42 is provided across opposite ends of the gear 30 to protect the gear 30 from direct contact with the carrier plates 24 and 26.

A primary advantage of the present invention is that the ceramic sleeves not only replace the previously known needle bearings, but also exhibit only minimal thermal expansion during use despite high temperatures. As such, failure of the planetary gear assembly from thermal expansion is greatly minimized, if not altogether eliminated.

Furthermore, the ceramic material is extremely tough and durable in construction and thus exhibits a longer life span than the previously known metal needle bearings.

From the foregoing, it can be seen that the present invention provides a simple and yet unique planetary gear assembly which is particularly well suited for automatic transmissions. Having described my invention, however, many modifications thereto will become apparent to those skilled in the art to which it pertains without deviation from the spirit of the invention as defined by the scope of the appended claims.

I claim:
1. A planetary gear assembly for a transmission comprising:
   a carrier having two spaced apart plates,
   a plurality of cylindrical axles extending between and secured to said plates, said axles being spaced apart and parallel to each other,
   a gear having an inner cylindrical surface and coaxially disposed around each said axle,
   mean for rotatably mounting each said gear to its associated axle,
   said rotatable mounting means comprising a tubular cylindrical sleeve disposed between at least one axle and said inner cylindrical surface of its associated gear, said sleeve being constructed of a ceramic material.
2. The invention as defined in claim 1 wherein said sleeve further comprises a pair of coaxial and axially adjacent ceramic sleeves.
3. The invention as defined in claim 1 and further comprising a radially outwardly extending annular flange at one end of said sleeve, said annular flange being of a one piece construction with said sleeve and extending over a portion of one end of its associated gear.
4. The invention as defined in claim 2 and further comprising a radially outwardly extending annular flange at one end of each said sleeve, said annular flange being of a one piece construction with said sleeve and extending over a portion of one end of its associated gear.

* * * * *